United States Patent [19]

Miller et al.

[11] Patent Number: 5,356,340

[45] Date of Patent: Oct. 18, 1994

[54] ONE PIECE INTEGRAL FLEXIBLE DRIVE SHAFT

[75] Inventors: Gregory P. Miller, Rochester; Mark S. Gibson, Sodus Center; Gerald M. DeVito, Ontario, all of N.Y.

[73] Assignee: Xerox Corporation, Stamford, Conn.

[21] Appl. No.: 21,934

[22] Filed: Feb. 24, 1993

Related U.S. Application Data

[63] Continuation-in-part of Ser. No. 753,243, Aug. 30, 1991, abandoned.

[51] Int. Cl.⁵ ................................................ F16D 3/52
[52] U.S. Cl. ...................................... 464/87; 464/181
[58] Field of Search .................... 464/181, 179, 88, 92, 464/51, 52, 97, 106, 147, 903, 73, 75, 153, 154, 155, 156; 403/293, 329, 357

[56] References Cited

U.S. PATENT DOCUMENTS

| | | | |
|---|---|---|---|
| 2,772,103 | 11/1956 | Strub | 464/179 X |
| 2,862,371 | 12/1958 | Cady | 464/87 |
| 3,332,255 | 7/1967 | Seagreaves et al. | 464/87 |
| 3,512,375 | 5/1970 | Madarasz et al. | 464/106 |
| 3,869,877 | 3/1975 | Brahler | 464/179 X |
| 3,961,855 | 6/1976 | Basile | 403/329 |
| 4,291,212 | 9/1981 | Bui | 464/51 X |
| 4,372,668 | 2/1983 | Malachowski et al. | 355/3 R |
| 4,660,963 | 4/1987 | Stemmle | 355/24 |
| 4,664,644 | 5/1987 | Kumata et al. | 464/180 |
| 4,758,204 | 7/1988 | Lindgren | 464/181 |

FOREIGN PATENT DOCUMENTS 2124735  2/1984  United Kingdom ............... 464/181

*Primary Examiner*—Daniel P. Stodola
*Assistant Examiner*—Eileen A. Dunn

[57] ABSTRACT

A one piece molded flexible drive shaft assembly of a hardened moldable material has an elongated flexible drive shaft core having a shaft drive input end, a shaft drive output end and integrally molded therewith at each end a coupling member of a hardened moldable material to connect the input end and the output end to a drive input and a drive output respectively.

12 Claims, 5 Drawing Sheets

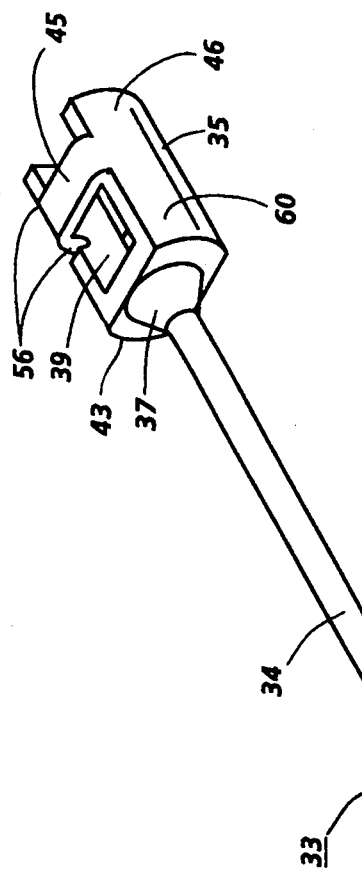
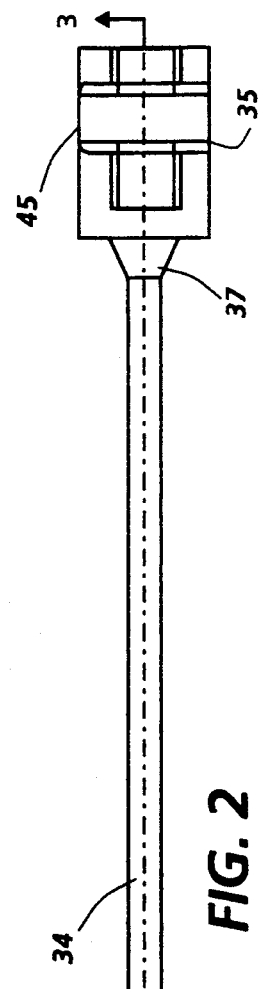
FIG. 1
FIG. 2

ONE PIECE INTEGRAL FLEXIBLE DRIVE SHAFT

This application is a continuation in part of copending U.S. application Ser. No. 07/753,243 filed Aug. 30, 1991, now abandoned.

BACKGROUND OF THE INVENTION

The present invention relates to a one piece molded flexible drive shaft assembly. In particular, it relates to a low cost, noise free, shaft assembly for connecting and transmitting rotary motion between a drive input and a drive output, which are offset relative to one another. The shaft assembly further includes integrally molded therein coupling members at each end of the drive shaft core to connect the shaft drive input end and the shaft drive output end to a drive input and a drive output respectively.

While the present invention has utility in apparatus comprising various mechanical components, it has particular application and will henceforth be described with reference to electrostatographic reproducing apparatus. Briefly, and as illustrated in FIG. 6 in electrostatographic printing apparatus commonly in use today a photoconductive insulating surface 10 which is typically the surface of a rotatably drum is charged to a uniform potential by a charge corotron 12 and thereafter exposed to a light image of an original document 15 to be reproduced on an exposure platen 16 by means of exposure lamp 17, the exposure discharges on the photoconductive insulating surface in exposed or background areas creating an electrostatic latent image on the photoconductive insulating surface of which corresponds to the image areas contained within the document. A developer unit 20 has developer material to developed the electrostatic latent image. Typically, the developer material has charged carrier particles and charged toner particles which triboelectrically adhere to the carrier particles and during development, the toner particles are attracted from the carrier particles to the charged areas of the photoconductive insulating surface. The developed image on the photoconductive insulating layer is subsequently transferred at a transfer station 24 to a support surface, such as copy paper 21, which is fed by feeder 22 to provide intimate transfer contact between the insulating area and the copy paper. The toner image on the copy paper is subsequently, permanently affixed on the copy paper by the application of heat and/or pressure in a fuser 23. Subsequent to the transfer of the toner image to the support surface, any residual toner remaining on the photoconductor is cleaned in a cleaner 24 in preparation for the next imaging cycle.

Alternatively, the electrostatic latent image may be generated from information electronically stored or generated in digital form which afterwards may be converted to alphanumeric images by image generation, electronics and optics. For further information on such apparatus, attention is directed to U.S. Pat. No. 4,372,668 to Malachowski et al., and U.S. Pat. No. 4,660,963 to Stemmle et al.

In these machines shafts are typically used to provide a variety of features, performing functions within the machines. Further, it is not unusual to have to provide a drive connection between two angularly and linearly offset shafts.

PRIOR ART

Typical prior art practice in providing a drive connection between two angularly and linearly offset shafts has been with the use of a steel flexible drive cable having separate fittings at each end to engage an input drive and an output drive. These typically take the form of helically wound wire or thin, flat strands of steel. While these devices are capable of operating satisfactorily in certain applications, the flexible steel drive cables are expensive and generate noise through the mechanical interaction of the flexible cable and in the fittings as well as the input and output drive members.

U.S. Pat. No. 4,758,204 to Lindgren discloses a flexible drive shaft system. The system includes a flexible shaft of a fiber-reinforced plastic material which connects two misaligned axis. The two ends of the shaft are rigidly attached and the shaft has a sufficiently low Young's modulus in the longitudinal direction and low flexural stiffness to enable positional changes between locations to be taken up by the bending of the shaft. To this end, the shaft has the form of a coreless tubular shaft in which a tubular wall comprises a substantially homogeneous material with the fibers distributed substantially uniformly over the whole cross-section.

SUMMARY OF THE INVENTION

In accordance with a principle feature of the present invention an inexpensive, noiseless, one-piece molded flexible drive shaft assembly is provided.

In particular, a drive shaft assembly is provided having an elongated, flexible drive shaft core, a shaft drive input end and a shaft drive output end and integrally molded therewith at each end a coupling member of a hardened moldable material to connect the input end and output end to a drive input and a drive output respectively, and the coupling members include means to rotatably securely connect them to one of the drive input and drive output which comprises an integrally molded noncircular shaft connecting member having an axis parallel to the drive shaft core and an elongated channel therein with an opening in the connecting member oriented parallel to the axis of the connecting member and extending substantially along the length of said connecting member defining two opposed sides parallel to the axis of the connecting member and an integrally molded biasing member extending across the opening perpendicular to the axis of the connecting member connecting the two opposed sides.

In a further aspect of the present invention the biasing member is a locking tie bar extending across a portion of the opening.

In a further aspect of the present invention the channel has two flat opposed parallel surfaces which engage flat surfaces on the mating drive input and drive output and one of the flat surfaces is on the inside surface of the locking tie bar.

In a further aspect of the present invention the two opposed sides are slightly curved.

In a further aspect of the present invention the shaft assembly is resiliently flexible in two dimensions and the coupling members at each end are capable of being aligned parallel to each other in different planes.

In accordance with a further aspect of the present invention, the means to rotatably securely connect the coupling member at the shaft input end may be the same or different from that at the shaft output end.

In a further aspect of the present invention, the means to rotatably securely connect includes an integrally molded noncircular shaft connecting member together with at least one integrally molded biasing member.

In a further aspect of the present invention, the shaft assembly is made of a hardened moldable material such as a polymeric material and maybe a thermoplastic resin or a elastomer and maybe filled with a fibrous filler material.

For a better understanding of the invention as well as other objects and further features, thereof references is had to the following drawings and descriptions.

BRIEF DESCRIPTION OF THE DRAWINGS

FIG. 1 is an isometric view of the flexible drive shaft assembly having coupling members integrally molded at each end of the drive shaft core to connect it to a drive input and a drive output.

FIG. 2 is a top view of the flexible drive shaft according to the present invention.

DESCRIPTION OF PREFERRED EMBODIMENT

Figure 3:
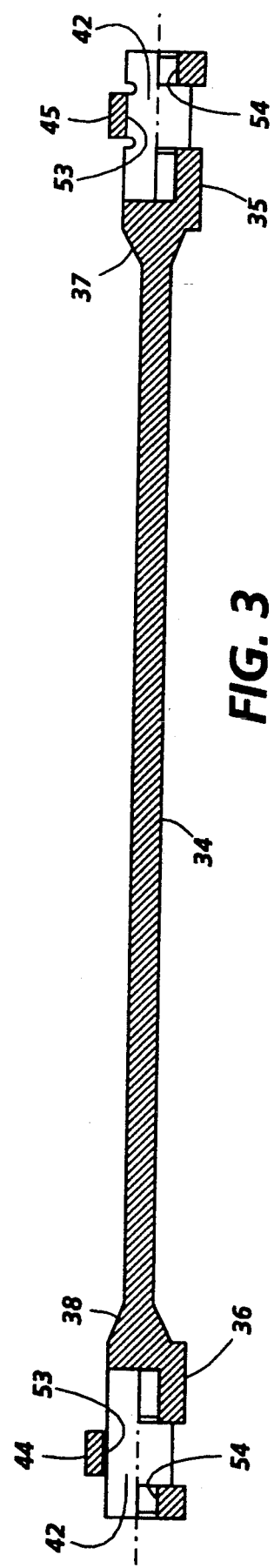
FIG. 3 is a sectional view taken along the line 3—3 of FIG. 2.
Figure 4:
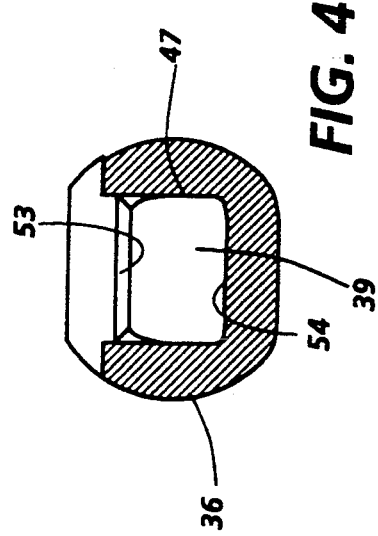
FIG. 4 is a sectional view taken along the line 4—4 of FIG. 2.

Attention is directed to FIGS. 1-5 for a more detailed understanding of the drive shaft assembly 33 of the present invention: As may be observed with specific reference to FIGS. 1-4 the drive shaft assembly is a single piece molded part made from a hardened moldable material which is, for example, a conventional polymeric thermoplastic resin and has an elongated flexible drive shaft core 34 having integrally molded onto each of the shaft drive input end 37 and the shaft drive output end 38 coupling members 35 and 36 to connect to a drive input 40 and drive output 41 respectively (See FIG. 5). As more clearly illustrated with reference to FIGS. 1 and 4 the coupling members 35 and 36 include integrally molded elongated noncircular shaft connecting members 60 and 47 having integrally molded biasing members such as locking tie bars 44 and 45 which serve to rotatably securely connect the coupling members 35 and 36 on the shaft drive input end 37 and output end 38 with the drive input 40 and drive output 41. The coupling members 35, 36 and connecting members 60, 47 have an axis which is generally parallel to the drive shaft core 34 and have an elongated channel 42 with an axis also parallel to the drive shaft core. The connecting members 60, 47 have openings 39, in the top of the channels 42 which are oriented parallel to the axis of the connecting member and extend substantially along the length of the connecting member. The opening 39 separates and defines two partially curved opposed sides 43, 46 parallel to the axis of the connecting members. The integrally molded locking tie bar is perpendicular to the axis of the connecting member and extends across a portion of the opening 39 connecting the two opposed sides 43, 46. While not absolutely necessary it is preferred that the locking tie bars 44 and 45 extend across the illustrated opening 39 in the top of the coupling member to connect the opposed sides of the connecting member enabling the coupling members to capture the shafts and not permit rotation of the shaft in the coupling member under operating conditions with a drive load. The channel 42 has two flat opposed parallel surfaces 54, 53 which engage flat surfaces on the mating drive input and drive output with one of the flat surfaces being the inside surface 53 of the locking tie bars 44, 45. The connecting member has small recesses 55, 56 on each side of the locking tie bars 44, 45 on only one of the opposed sides to facilitate the molding process. While the coupling members 35, 36 at both ends of the shaft assembly have been illustrated as being the same it will be understood that they may be different to accommodate different input and output drives. For example, they may differ in size or shape or both to accommodate different input and output.

Figure 5:
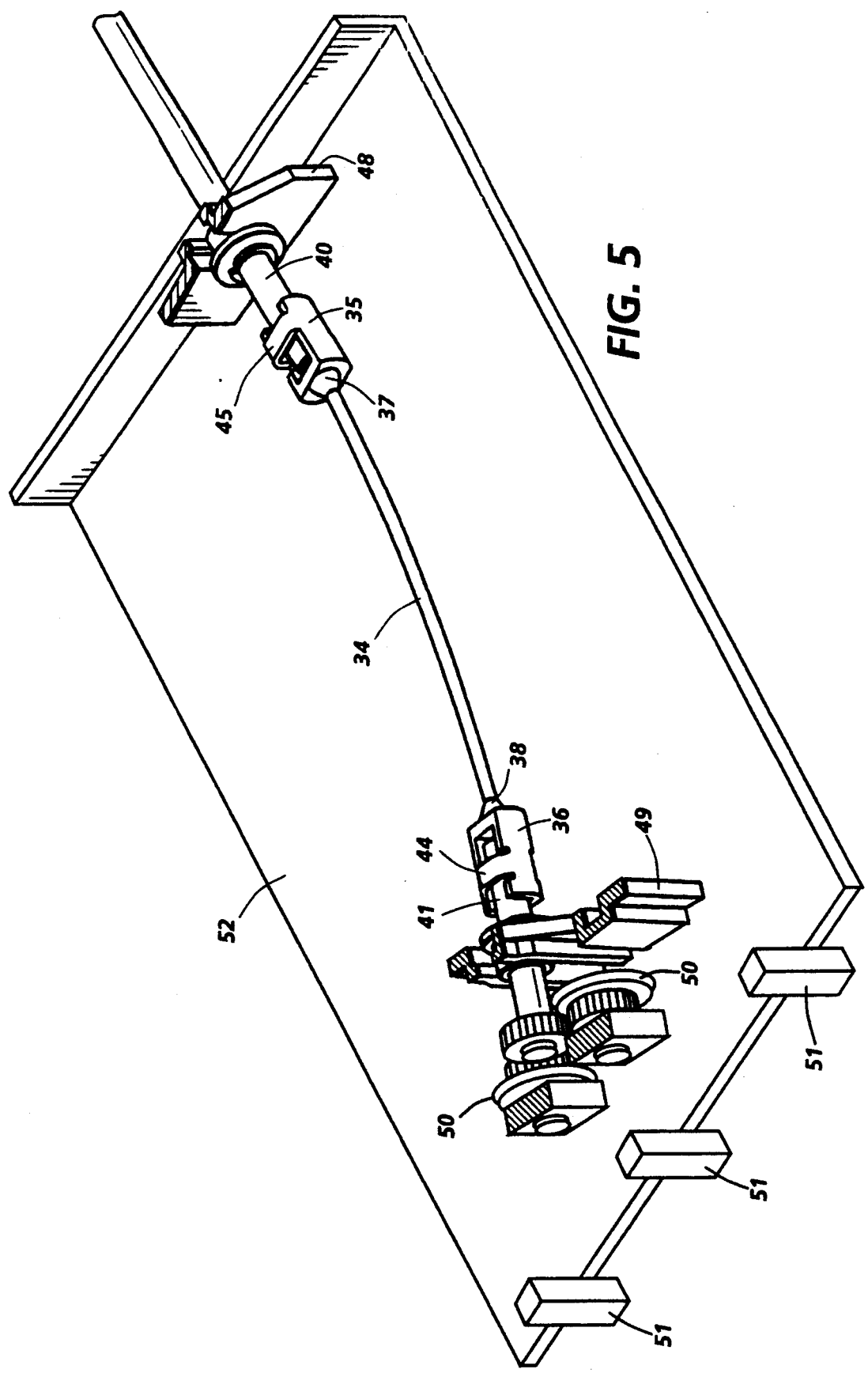
FIG. 5 is an isometric view for flexible drive shaft according to the present invention rotatably securely connected a drive input and a drive output which are linearly and angularly offset in a sheet registration system.
Figure 6:
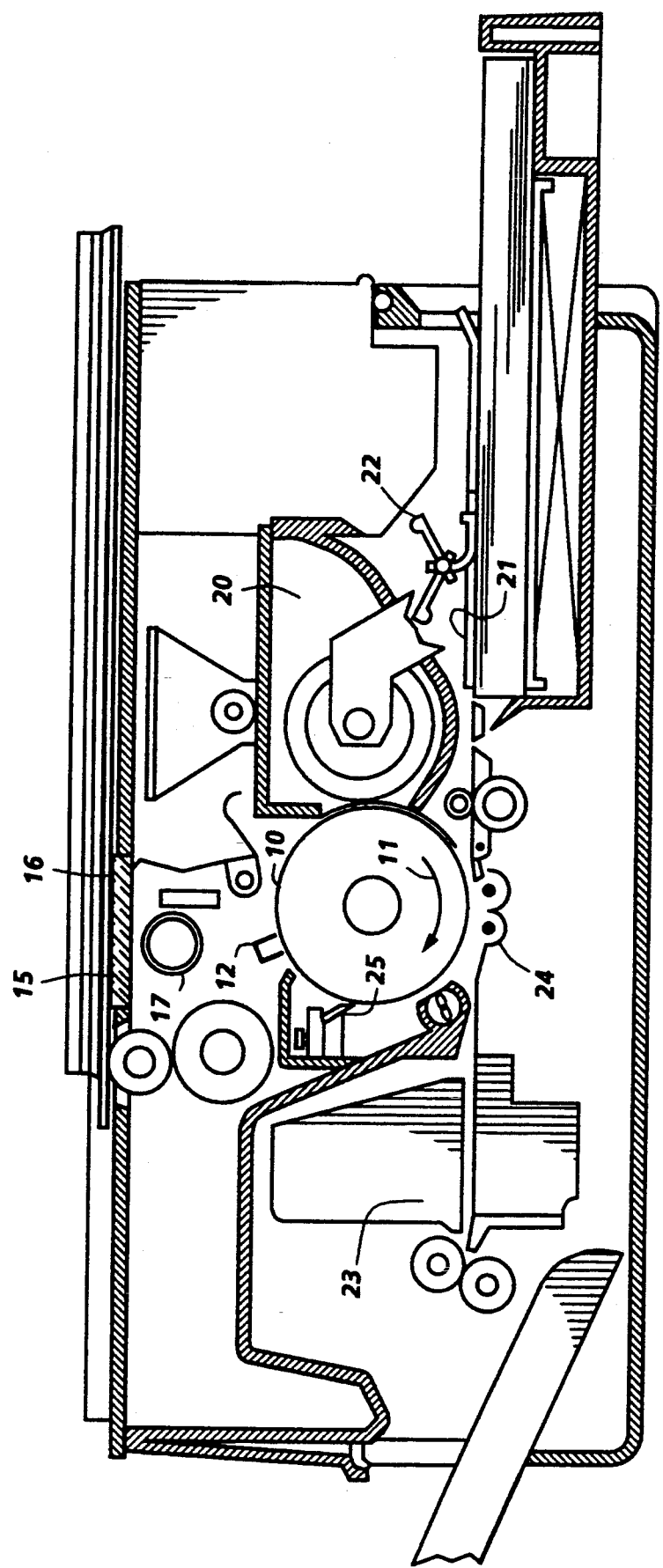
FIG. 6 is a schematic representation in cross sect on of an automatic reproducing machine which may employ the flexible drive shaft assembly according to the present invention.

FIG. 5 illustrates the operation of the one piece flexible drive shaft in delivering rotational motion from an input drive shaft 40 supported by bracket 48 permanently fixed to the side of a sheet registration device to an output drive shaft 41 which is linearly and angularly offset from shaft 40, and supported by a fixed bracket 49 to drive registration rolls 50 to register a sheet against registration gates 51 in a paper registration system. It should be noted that the supporting brackets 48 and 49 in FIG. 5 are supported by structure (not completely shown) to be out of contact with the sheet feed table 52.

Figure 7:
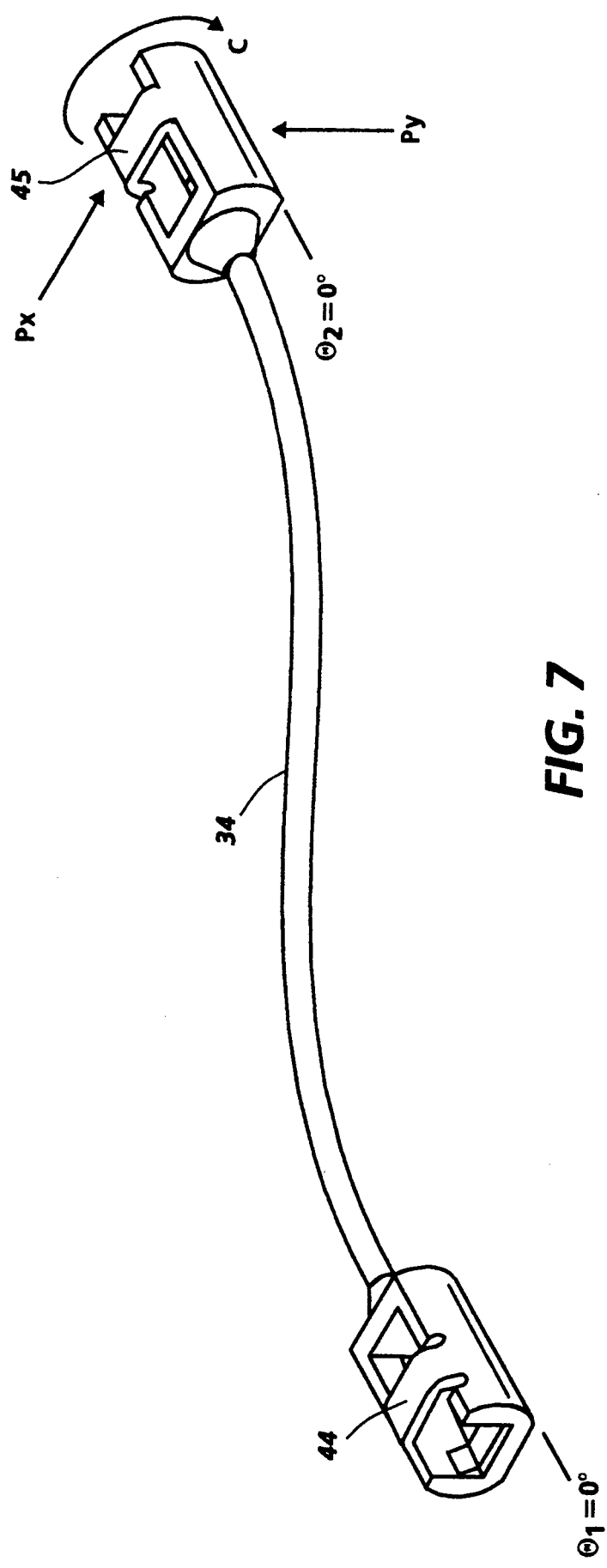
FIG. 7 is a schematic representation of the flexible drive shaft assembly with the coupling members in parallel planes.

In operation the shaft 34 is resiliently flexible in two dimensions and the coupling members at each end are capable of being aligned in different planes parallel to each other as illustrated in FIG. 7 where the shaft is acted on by a force n the X direction, $P_x$, a force in the Y direction, $P_y$, and a couple or moment to produce angles $\Theta_1$ and $\Theta_2$ created by the deflection between the plane of the coupling members and the horizontal such that $\Theta_1 = \Theta_2 = 0$.

Under the boundary conditions $\Theta_1 = \Theta_2 = 0$ the deflection, d, in the Y and X directions are represented by the basic formula:

$$d_y = \frac{P_x L^3}{3EI}, \, d_x = \frac{P_y L^3}{3EI}$$

and the deflection due to the couple or moment by the formula:

$$d_c = \frac{ML^2}{2EI}$$

, where P is the force, L is the length of the drive shaft core, E is the modulus of elasticity, I is the moment of inertia and M the moment. The angles produced in the X and Y direction by the deflection are represented by the formula:

$$\Theta_y = \frac{P_y L^2}{2EI}, \, \Theta_x = \frac{P_x L^2}{2EI},$$

and the angle produced by the couple or moment by the formula:

$$\Theta_c = \frac{ML}{EI}$$

The hardenable, moldable material may be selected from a wide variety of materials which can be handled in a molding process and provide the characteristics and properties to the functional features including high or low friction, specific electrical properties, lubricity and the like. Typical injection moldable or castable materials include the thermoplastic and thermosetting resins. Typical thermoplastic resins include polyethylene, polystyrene, polypropylene, polyurethane, polyvinylchloride, nylons, polycarbonate, ABS, as well as certain fluorocarbons, such as Teflon TM. Typical thermosetting resins include acrylics, phenolics and polyesters.

In addition, there may be applications in which elastomers such as silicone rubber may be used as the hardenable, moldable material and applications where the drive core is made of an elastomer and the integrally molded coupling member are of some other material such as, for example, a thermoplastic resin. The moldable material may be used in a filled or unfilled form and may be filled with materials to impart selected properties such as fire retardancy to the shaft assembly. If desired, the moldable material may be formed with the use a conventional blowing agent as in the the case of, for example, microcellular polyurethane. Further, the moldable material may be filled or unfilled with, for example, up to 30 parts by weight glass fibers per 100 parts by weight resin and may have added other ingredients for selected properties, such as pigments to impart a particular color or other materials for desired properties.

The selection of materials and design of the shaft should provide one which is balanced with respect to flexural modulus stiffness, resiliency and fatigue resistance to meet the requirements of each particular application with respect to the offset of the input and output shafts and the torque involved in the particular geometry. For example, the shaft should be flexible enough to bend with each revolution with wrapping on itself but stiff enough to drive the required torque without breaking. In addition; generally the greater the offset, or sharper corner between the input drive and the output drive, the longer the shaft length will be to establish as large a radius as possible. This follows from the fact that a straight line is the ideal.

The flexible drive shaft, according to the present invention, can by manufactured from the hardenable moldable material from a variety of conventional molding and casting processes including injection molding, blow molding, compression molding and casting. In addition, it could be insert or outsert molded to provide different materials for the shaft drive core and coupling members. Furthermore, localized gating can be utilized to eliminate air bubbles which otherwise would significantly reduce the fatigue characteristics of the shaft in a preferred embodiment a flexible drive shaft as illustrated in FIG. 5 when used in a sheet registration system and made from nylon (Zytel 101 Black available from E.I. dupont deNemours & Co.) which has a shaft drive core about 110 millimeters long and 2.5 millimeters in diameter with coupling member at each end about 14 millimeters long and about 8 millimeters thick is capable of withstanding the stresses induced by driving through a radius of 230 millimeters. The deflection must be at least 10 millimeters for such a shaft fixed by the coupling member to a drive shaft at one end when a force of 0.23 newtons is applied to the coupling member on the opposite end of the flexible shaft.

Accordingly, a new inexpensive noise-free flexible drive shaft has been provided which enables providing a drive connection between two angularly and linearly offset shafts.

The patents specifically referred to herein are hereby specifically incorporated in their entirety by reference.

While the invention has been described with reference to a shaft assembly useful in electrostatographic printing machine, it will be understood to those skilled in the art that it may be used in virtually any machine performing a function which requires the use of a rotatable shaft member. Accordingly, it is intended to embrace all such alternatives and modifications as may fall within the spirit and scope of the appended of claims.

We claim:

1. A one piece molded flexible drive shaft assembly of a hardened moldable material comprising an elongated flexible drive shaft core having a shaft drive input end, a shaft drive output end and integrally molded therewith at each end a coupling member of a hardened moldable material to connect said input end and output end to a drive input and a drive output respectively, and wherein each of said coupling members includes means to rotatably securely connect it to one of said drive input and drive output comprising an integrally molded noncircular shaft connecting member having an axis parallel to said drive shaft core and having an elongated channel therein with an axis parallel to said drive shaft core and an elongated opening in said connecting member oriented parallel to the axis of said connecting member and extending substantially along the length of said connecting member, said opening defining two opposed sides parallel to said axis and an integrally molded biasing member extending across said opening perpendicular to the axis of said connecting member connecting said two opposed sides of said connecting member.

2. The shaft assembly of claim 1 wherein said two opposed sides are curved.

3. The shaft assembly of claim 1 wherein it is resiliently flexible in two dimensions and the coupling members at each end are capable of being aligned parallel to each other in different planes.

4. The shaft assembly of claim 1 wherein said hardened moldable material is a polymeric material.

5. The shaft assembly of claim 1 wherein said hardened, moldable material is a thermoplastic resin.

6. The shaft assembly of claim 1 wherein said hardened, moldable material is an elastomer.

7. The shaft assembly of claim 1 wherein said biasing member is a locking tie bar extending across a portion of said opening.

8. The shaft assembly of claim 7 wherein said channel has two flat opposed parallel surfaces which engage flat surfaces on the mating drive input and drive output and one of said flat surfaces is on the inside surface of said locking tie bar.

9. The shaft assembly of claim 7 wherein said means to rotatably securely connect the coupling member at the shaft input end is the same for the shaft output end.

10. The shaft assembly of claim 7 wherein said means to rotatably securely connect the coupling member at the shaft input end is different from the shaft output end.

11. The shaft assembly of claim 10 wherein said hardened, moldable material is a nylon.

12. The shaft assembly of claim 10 wherein said polymeric material has a fibrous filler.

* * * * *